Nov. 4, 1924.
E. S. MINER
1,514,557
REAR END EQUIPMENT SUPPORT
Filed June 19, 1923    2 Sheets-Sheet 1
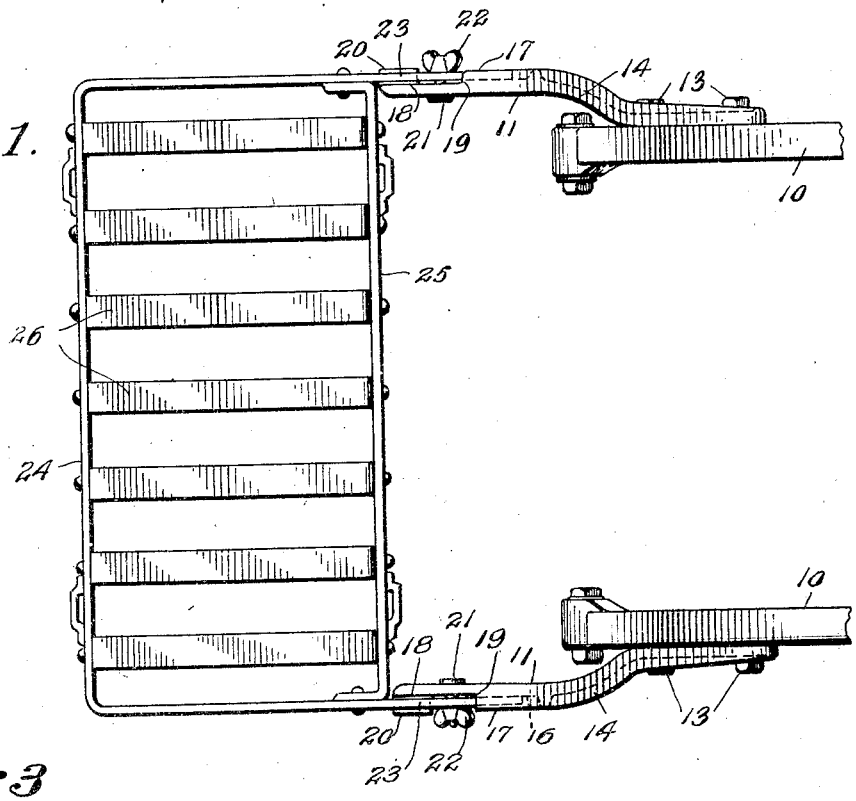
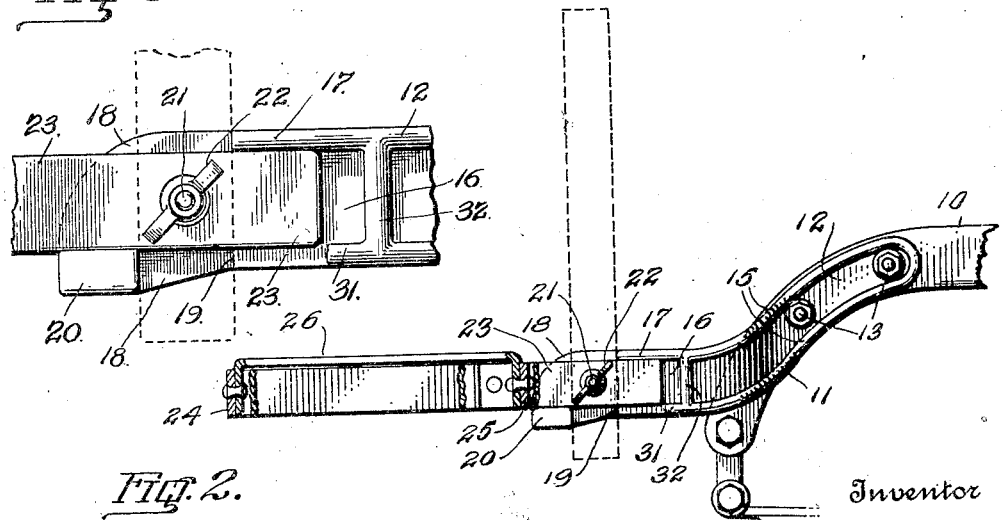
Inventor
Eugene S. Miner.
Attorney

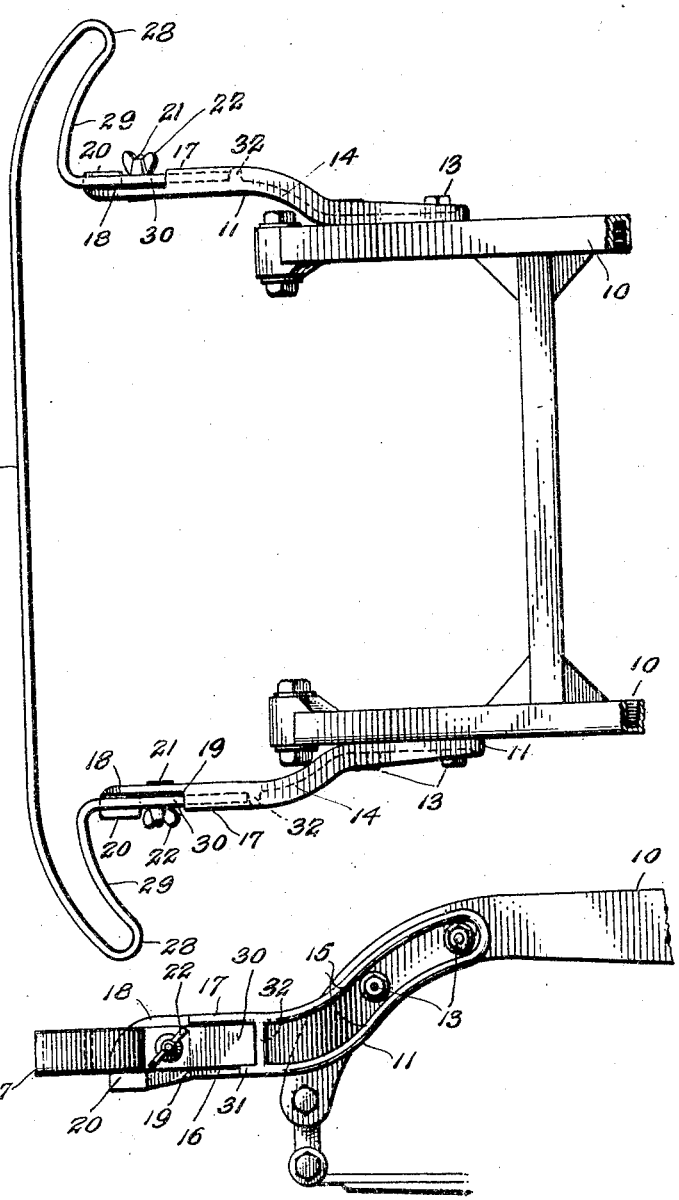

Patented Nov. 4, 1924.

1,514,557

UNITED STATES PATENT OFFICE.

EUGENE S. MINER, OF SAN FRANCISCO, CALIFORNIA, ASSIGNOR OF ONE-HALF TO SIDNEY B. SARGEANT, OF SAN FRANCISCO, CALIFORNIA.

REAR-END EQUIPMENT SUPPORT.

Application filed June 19, 1923. Serial No. 646,479.

*To all whom it may concern:*

Be it known that I, EUGENE S. MINER, a citizen of the United States, residing in the city and county of San Francisco and State of California, have invented a new and useful Improvement in a Rear-End Equipment Support, of which the following is a specification.

My invention relates to improvements in automotive equipment wherein a pair of rear end brackets operate to pivotally support a trunk rack in a folded or extended position, and a rear end bumper rigidly in an extended position.

The primary object of the present invention is to provide a new and improved device adapted to detachably engage and support a folding trunk rack.

A further object is to provide a device of the character described having facilities for detachably engaging and rigidly retaining a rear end bumper.

Another object is to afford facilities for readily and easily supporting rear end equipment in a detachable manner whereby one piece of rear end equipment may be easily and readily substituted for another.

Another object is to provide a rear end equipment supporting device whereby detachable members may be either adjustably or rigidly secured.

I accomplish these and other objects by means of the device disclosed in the drawings forming a part of the present specification wherein like characters of reference are used to designate similar parts throughout the said specification and drawings, and in which—

Fig. 1 is a plan view showing a trunk rack in its normal place.

Fig. 2 is a side elevation, partly in section, showing the trunk rack ready to receive luggage in full lines, and in folded position in dotted lines;

Fig. 3 is an enlarged broken view of a portion of the bracket;

Fig. 4 is a plan view of a bumper secured to the brackets, and,

Fig. 5 is a side elevation thereof.

Referring to the drawings 10 indicates the side members of the frame of the chassis of an automobile or other vehicle, to which are secured the brackets 11.

These brackets have portions thereof shaped to conform to the curvature of the rearward extensions of the vehicle frames as shown at 12, and these portions are bolted or otherwise secured to the frame as at 13. Due to the variance of construction of the chassis frames, standard designs will be provided, and may be secured by bolts, clamps or such means as become necessary to meet each occasion.

These brackets are curved outwardly as at 14 to clear the shackle supporting bolts and also present general rearwardly extending portions in line with the ends of carriers or such other attachments as may be made.

In the general construction of these brackets, a web is presented having flanges or beads 15 formed at the edges thereof. In the construction with the web and beads, a surface 16 is formed, with the portion 17 of the upper bead forming an overhanging stop to limit the upward movement of inner ends of extensions clamped against the surface 16, and by the slightly depressed surface 18, a shoulder 19 is formed. A lug 20 is cast integral with the bracket and by detachable bolts, 21, provided with wing nuts, or other clamping means 22, extensions 23 of detachable members may be secured to these brackets. In positioning the several parts, the overhanging portions 17 and lugs 20 engage the upper and lower edges respectively of the extensions 23 on opposite sides of the pivotal bolts 21 to hold them in place, and the fastening means 21 and 22 lock these extensions in fixed relation.

As shown, the extensions are formed by bending a bar 24 into U shape and with a cross member 25 secured at its ends to the extensions 23 a rectangular frame is had, to support the trunk supporting bars 26. By having the bars 26 raised slightly above the rigid members 24 and 25, and having these bars 26 of a flexible nature, the constant rumble and shock condition due to the motion of the vehicle will not be transmitted to the trunk or other luggage and less vibration of the parts occurs.

With the trunk rack in extended position and in use, it may be securely locked as a rigid construction, and when not in use, on the vehicle, it may be swung upwardly to vertical position, and there also securely locked, by having the extensions 23 contact with portions of the surface 18, and with the edge of the extension against the shoulder 19, being so held by the clamping members 21 and 22. To provide for this position the overhang 17 and lug 20 are spaced to have their ends function as stops in the vertical position of the extensions 23.

When it is desired that the trunk rack be removed from the vehicle, as in city driving, by releasing the nuts and bolts 22 and 21, the extensions 23 may be withdrawn from the brackets and a bumper substituted therefor. This bumper may be of any of the approved types, but I have shown a continuous bar 27, in Figs. 2 and 4, and this is bent upon itself as at 28 to give the desired flexibility and the bent portions 29 are again bent to present the extensions 30, in line with the surfaces 16 of the brackets. The extensions 30 also have holes formed therein to receive the fastening means 21 and 22, but the distance from the point of support of each extension to the remote end is greater than is the case with each extension 23. This added length causes the remote end to engage against the surface 16, rib 32 under the overhang 17 and also above the projection 31 formed by one of the beads 15. By this, the bumper is held against adjustment, and impact with an object will not cause the bumper to swing up out of position. The projection 31 clears the end of extensions 23, however as it is desired that the trunk rack be adjustable.

No limitation is implied by the showing, as while the drawing suggests a casting with detachable members of bar stock, other combinations may be made, using the same novel ideas, and adapted as required under different conditions.

Having thus described my invention, what I claim as new and desire to secure by Letters Patent is—

1. A rear end equipment support for motor vehicles comprising a bracket adapted for attachment to each side of a vehicle frame and having lugs formed thereon for supporting rear end equipment in an extended or folded position.

2. A rear end equipment support for motor vehicles comprising a bracket adapted for attachment to each side of a vehicle frame and having lugs formed thereon for supporting end equipment in an extended or folded position; and means for holding said equipment in fixed relation with said lugs.

3. A rear end equipment support for motor vehicles comprising a pair of brackets arranged to be attached to each side of a vehicle frame and having lugs formed thereon in spaced relation to each other; and means positioned between said lugs for pivotally connecting rear end members to be supported in fixed or adjustable position by said lugs.

4. In an article of the class described, a bracket, lugs formed on said bracket in spaced relation, a detachable member carried by said bracket and held in the limits of movement by said lugs, and fastening means for said bracket and detachable members.

5. In an article of the class described, a bracket, portions of said bracket forming a contact surface with projecting lugs in spaced relation to one another, a detachable member pivotally carried by said bracket, said lugs being spaced to present stops in the movement of said detachable member in a swinging motion.

6. In the article of the class described, a bracket having portions thereof forming lugs and a contacting surface and arranged to receive any one of a plurality of detachable members, said lugs being so spaced as to hold such detachable member rigidly against movement or to permit a swinging motion as desired.

7. In an article of the class described, a bracket, a contacting surface formed on said bracket, lugs formed in spaced relation about said contacting surface, a shoulder formed by a depressed portion of said bracket in juxtaposition to said lugs, a detachable member carried by said bracket against contacting surface and between said lugs, and said detachable members overlying said shoulder in certain positions, while engaging therewith in other positions to lock said detachable member relatively to said bracket.

8. In an article of the class described, a pair of brackets adapted to receive any one of a plurality of detachable members to be carried thereby, said brackets being provided with lugs formed thereon to engage and limit the movement of a detachable member relative to the brackets and also provided with contacting surfaces in different planes against which such member bears; and a shoulder formed between said planes of contacting surfaces, said shoulder and the lugs being spaced to permit the detachable members to be mounted in rigid relation or to afford a limited oscillation as desired.

In witness whereof I hereunto set my signature.

EUGENE S. MINER.